United States Patent
Soriano Fosas et al.

(10) Patent No.: US 9,985,456 B2
(45) Date of Patent: May 29, 2018

(54) POWER MANAGEMENT

(71) Applicant: HEWLETT-PACKARD DEVELOPMENT COMPANY, L.P., Houston, TX (US)

(72) Inventors: David Soriano Fosas, Sant Cugat del Valles (ES); Marc Soler Jauma, Barcelona (ES); Juan Luis Lopez Rodriguez, Sant Cugat del Valles (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days. days.

(21) Appl. No.: 15/310,675

(22) PCT Filed: May 29, 2014

(86) PCT No.: PCT/US2014/039943
§ 371 (c)(1),
(2) Date: Nov. 11, 2016

(87) PCT Pub. No.: WO2015/183274
PCT Pub. Date: Dec. 3, 2015

(65) Prior Publication Data
US 2017/0077721 A1    Mar. 16, 2017

(51) Int. Cl.
*G03G 15/00* (2006.01)
*H02J 7/00* (2006.01)
(Continued)

(52) U.S. Cl.
CPC ............... *H02J 7/007* (2013.01); *B41J 23/00* (2013.01); *G03G 15/80* (2013.01); *H02J 7/34* (2013.01); *H02J 3/32* (2013.01)

(58) Field of Classification Search
CPC .. H02M 1/08; H02M 2001/0009; H02M 1/12; H02M 2003/1566; H02M 3/158;
(Continued)

(56) References Cited

U.S. PATENT DOCUMENTS 5,789,723 A    8/1998  Hirst
2004/0145926 A1  7/2004  Akihiko et al.
(Continued)

FOREIGN PATENT DOCUMENTS

JP    H08308101    11/1996
KR    20050106745   11/2005

OTHER PUBLICATIONS

Tayjasanant, T. et al., Interharmonic-Flicker Curves, IEEE Transactions on Power Delivery, vol. 20, No. 2, Apr. 2005, pp. 1017-1024.

*Primary Examiner* — Roy Y Yi
(74) *Attorney, Agent, or Firm* — HP Inc. Patent Department

(57) ABSTRACT

A controller is to control a discharger to provide power from an energy storage to an electrical device during a period when the electrical device is to require a power maximum. The controller is to control the charger to provide power from a power supply to the energy storage during a period when the electrical device is to require a power minimum. The electrical device is to be powered by a power supply.

13 Claims, 5 Drawing Sheets

(51) Int. Cl.
*H02J 7/34* (2006.01)
*B41J 23/00* (2006.01)
*H02J 3/32* (2006.01)

(58) Field of Classification Search
CPC .. H02M 3/1584; H02M 3/33507; H02M 1/14; H02M 2001/0045; H02M 3/1582; H02M 7/23; H02M 7/537; H02M 1/32; H02M 1/44; H02J 7/025; H02J 7/045; H02J 7/345; H02J 7/35; H02J 9/061; G03G 15/2039

See application file for complete search history.

(56) References Cited

U.S. PATENT DOCUMENTS

| | | | |
|---|---|---|---|
| 2006/0124630 A1 | 6/2006 | Chae et al. | |
| 2008/0106255 A1* | 5/2008 | Smith | G06F 1/28 |
| | | | 324/142 |
| 2010/0316404 A1 | 12/2010 | Fukuzawa et al. | |
| 2010/0322656 A1 | 12/2010 | Chosokabe et al. | |
| 2013/0033532 A1 | 2/2013 | Zhao et al. | |
| 2013/0346762 A1 | 12/2013 | Hodges et al. | |
| 2014/0219676 A1* | 8/2014 | Sato | G03G 15/80 |
| | | | 399/88 |

* cited by examiner

POWER MANAGEMENT

BACKGROUND

Many electrical devices, such as printers, may have variable power consumption over time while operational. A printer, for example, may record an image on substrate during a print job and the power consumption of the printer may vary as the image is printed.

BRIEF DESCRIPTION

Some examples are described with respect to the following figures.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

Electrical devices, such as printers, may have variable power consumption over time while operational. In some examples, this may involve rapid changes in power requirements. Examples of such rapid changes include flicker, which are rapid fluctuations in power as a function of time. Thus, power supplies that provide power may exhibit flicker, which may cause systems electrically connected to the power supplies to show visible signs of the flicker such as through fluctuating lighting. This may result in adverse health effects to users nearby, and/or electrical disturbances that may damage other electrical equipment.

Accordingly, the present disclosure provides power management apparatuses, computer-readable media, and power management methods. The present disclosure may, in some examples, allow the power supply to supply power at a smoother rate, with reduced flicker. This may be done, for example, by predicting current and future power consumption by an electrical device such as a print engine. The present disclosure provides power management apparatuses which, in some examples, function efficiently and without slowing down printing, can be built cost-effectively, and can be implemented in a small size compared to other energy storage systems. One or more of these effects may, in some examples, be accomplished by the following examples.

Figure 1:
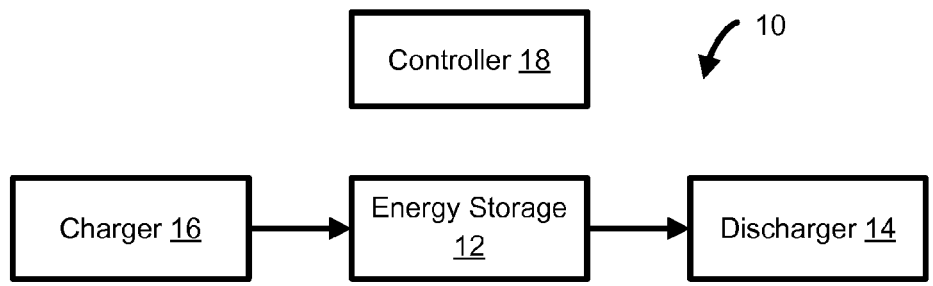
FIG. 1 is a simplified block diagram of a power management apparatus according to some examples.

FIG. 1 is a simplified block diagram of a power management apparatus 10 according to some examples. The power management apparatus 10 may be electrically disposed between an electrical device and a power supply. The power supply may be to power the electrical device. The apparatus 10 may include an energy storage 12, a discharger 14 to provide power from the energy storage 12 to the electrical device, and a charger 16 to provide power from the power supply to the energy storage 12. The apparatus may include a controller 18 to control the discharger 14 to provide power from the energy storage 12 to the electrical device during a period when the electrical device is to require a power maximum, and to control the charger to provide power from the power supply to the energy storage 12 during a period when the electrical device is to require a power minimum.

As understood herein, where power is provided over a period of time, a "power maximum" is a time point where power is provided at a higher amount as compared to one or more other time points in a local region in the period of time. Similarly, a "power minimum" is a time point where power is provided at a lower amount as compared to one or more other time points in a local region in the period of time. A power maximum is necessarily global maximum, and a power minimum is not necessarily a global maximum.

Figure 2:
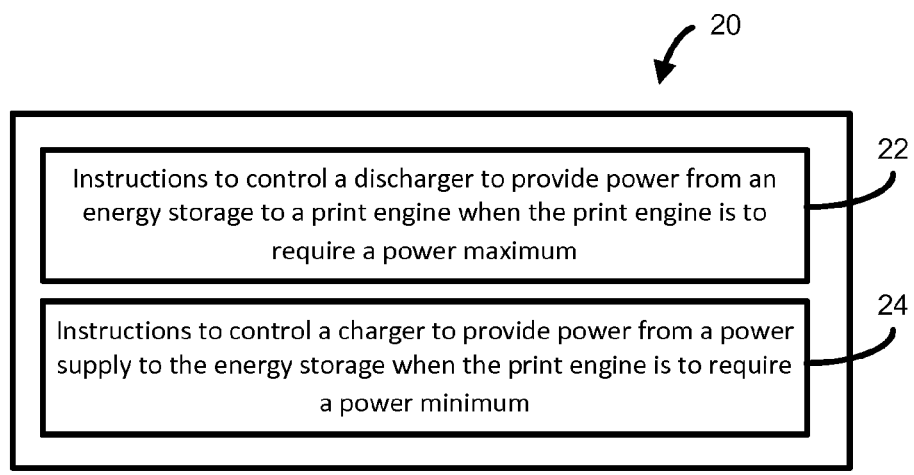
FIG. 2 is a flow diagram illustrating a power management method according to some examples.
Figure 3:
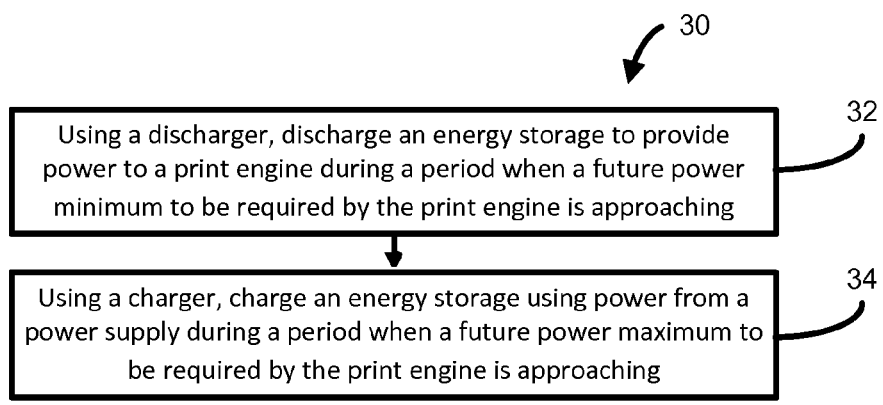
FIG. 3 is simplified block diagram of a non-transitory computer readable medium according to some examples.

FIG. 2 is a simplified block diagram of a non-transitory computer readable medium 20 according to some examples. The non-transitory computer readable storage medium 20 may including executable instructions 22 that, when executed by a processor, cause the processor to control a discharger to provide power from an energy storage to a print engine when the print engine is to require a power maximum. The non-transitory computer readable storage medium 20 may further including executable instructions 24 that, when executed by a processor, cause the processor to control a charger to provide power from a power supply to the energy storage when the print engine is to require a power minimum. The print engine may be powered by the power supply; and FIG. 3 is a flow diagram illustrating a power management method 30 according to some examples. At 32, using a discharger, an energy storage may be discharged to provide power to a print engine during a period when a future power minimum to be required by the print engine is approaching. At 34, using a charger, an energy storage may be discharged using power from a power supply during a period when a future power maximum to be required by the print engine is approaching. The print engine may be powered by a power supply.

Figure 4:
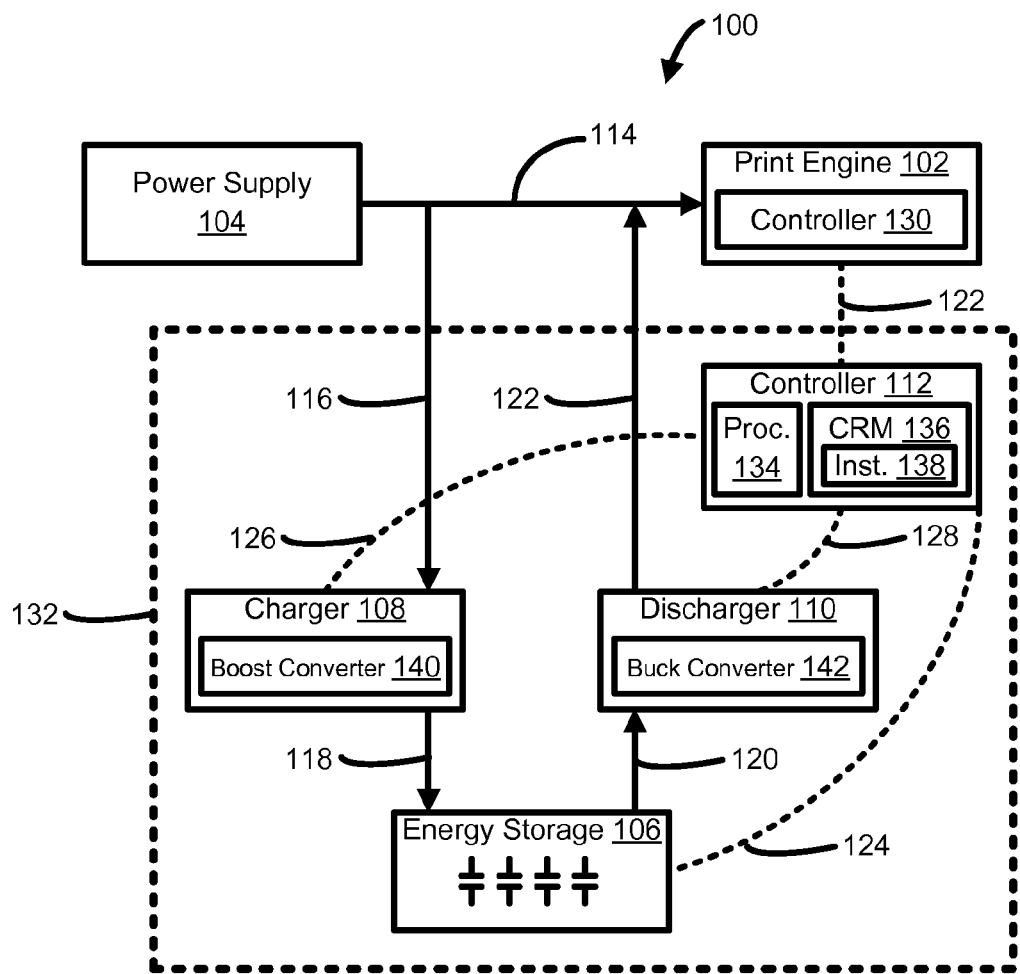
FIG. 4 is a simplified block diagram of a printing system having a power management apparatus according to some examples.

FIG. 4 is a simplified block diagram of a printing system 100 according to some examples. The printing system 100 may include a print engine 102, power supply 104, and power management apparatus 132. Although examples are described herein with a print engine 102 as an electrical device, other electrical devices may be used in a system having the power supply 104 and the power management apparatus 132.

The print engine 102 may be for printing on a substrate. The print engine 102 may be a printer or may be part of a printer. The substrate may be advanced through a print zone of the print engine by a media advance mechanism, such as a roller or other suitable mechanism.

In some examples, the print engine 102 may comprise one or more inkjet printheads, for example thermal inkjet printheads or piezo inkjet printheads. Each printhead may comprise an array of printhead nozzles through which drops of printing fluid may be selectively ejected onto the substrate. In other examples, the print engine 102 may comprise a charged photoconductive roller, laser, and development roller. The charged photoconductive roller may rotate while a laser removes charge from certain locations on the roller representing the image to be placed onto the substrate. The locations with removed charge are then rolled past a development roller having a toner disposed thereon. The toner is given the same charge as the photoconductive roller. The locations where the charge was removed by the laser will pick up the charged toner particles. The toner is then pressed onto the substrate as it passes along the photoconductive roller. In some examples, the print engine 102 may be an additive manufacturing system to generate three-dimensional objects, rather than a system to print an image on a two-dimensional substrate. In yet other examples, the print engine 102 may have different configuration.

The printing system 100 may include a power supply 104. The power supply 104 may receive input power, for example from an alternating current (AC) power line. The power supply 104 may include suitable components, such as suitable power circuitry and control circuitry, to provide output power via electrical connection 114, which may be a main power supply rail. The output power may, for example, have a direct current (DC) power output voltage. The output power may be used to power the print engine 102. The power supply 104 may control the output voltage and the output current.

The operation of the print engine 102 is generally controlled by a printer controller coupled to the print engine 102 and power supply 104, in accordance with image data representing an image to be printed.

The power management apparatus 132 may be to reduce flicker in the output power received by the print engine 102. The power management apparatus 132 may include an energy storage 106, charger 108, discharger 110, and controller 112.

The energy storage 106 may comprise a capacitor bank having one or more capacitors. The capacitor bank may, for example, be a high voltage energy storage system (HVES) having high value capacitors such as supercapacitors. However, in other examples, the energy storage 106 may comprise other types of energy storage devices.

The charger 108 may consume current from the power supply 104 via the electrical connections 116 and 114, and may provide the current to the energy storage 106 via electrical connection 118. The charger 108 may, for example, comprise or may be a boost converter 140, which provides an output voltage greater than its input voltage, and thus provides an output current lower than its input current. However, in other examples, the charger 108 may comprise or may be other suitable charging devices.

The discharger 110 may consume current from the energy storage 106 via electrical connection 120, and may provide the current to the power supply 104 via electrical connections 122 and 114. The discharger 110 may, for example, comprise or may be a buck converter 144, which provides an output voltage lower than its input voltage, and thus provides an output current greater than its input current. However, in other examples, the discharger 110 may comprise or may be other suitable discharging devices.

The controller 112 may include a processor 134 for executing instructions such as those described in the methods herein. The processor 134 may, for example, be a microprocessor, a microcontroller, a programmable gate array, an application specific integrated circuit (ASIC), a computer processor, or the like. The processor 155 may, for example, include multiple cores on a chip, multiple cores across multiple chips, multiple cores across multiple devices, or combinations thereof. In some examples, the processor 155 may include at least one integrated circuit (IC), other control logic, other electronic circuits, or combinations thereof.

The processor 134 may be in communication with a computer-readable storage medium 136 via a communication bus. The computer-readable storage medium 136 may include a single medium or multiple media. For example, the computer readable storage medium 136 may include one or both of a memory of the ASIC, and a separate memory in the controller 112. The computer readable storage medium 136 may be any electronic, magnetic, optical, or other physical storage device. For example, the computer-readable storage medium 136 may be random access memory (RAM), static memory, read only memory, an electrically erasable programmable read-only memory (EEPROM), a hard drive, an optical drive, a storage drive, a CD, a DVD, and the like. The computer-readable storage medium 136 may be non-transitory. The computer-readable storage medium 136 may store, encode, or carry computer executable instructions 138 that, when executed by the processor 134, may cause the processor 134 to perform steps of any of the methods or operations disclosed herein according to various examples.

The print engine 102 may include a controller 130, which may have similar features as the controller 112. The controller 130 may be to receive and store image data representing an image to be printed on the substrate. The controller 130 may use the image data to generate and store printing agent delivery control data, which may define where a printing agent, such as ink or toner, is to be printed on the substrate using the print engine 102. The printing agent delivery control data may, for example, comprise halftone data. Based on the printing agent delivery control data, the controller 130 may be determine and store, prior to print job, a power consumption profile representing the power expected to be consumed as a function of time during the print job. When printing, the print engine 102 may then draw power from a combination of the power supply 104 and the power management apparatus 132 according to the power consumption profile.

The controller 112 may be in communication with the controller 130 via connection 122, the energy storage 106 via connection 124, the charger 108 via connection 126, and the discharger 110 via connection 128. The connections may be any suitable wired or wireless connections enabling communication.

Figure 5:
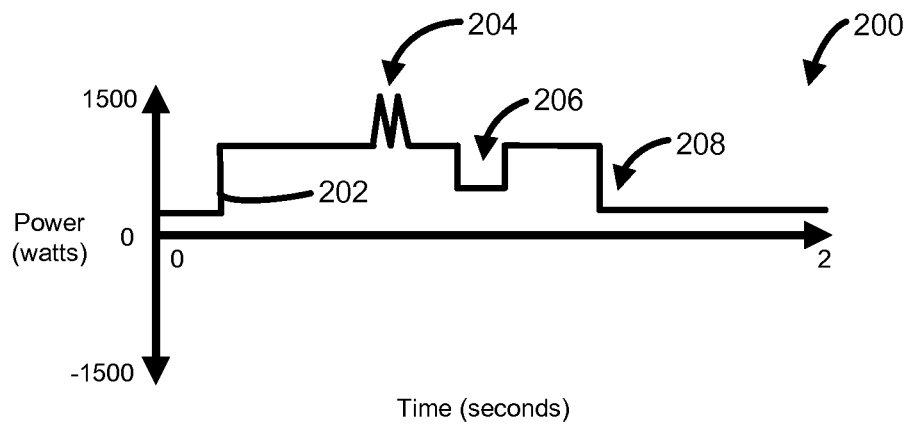
FIG. 5 is a chart illustrating a power consumption profile according to some examples.
Figure 6:
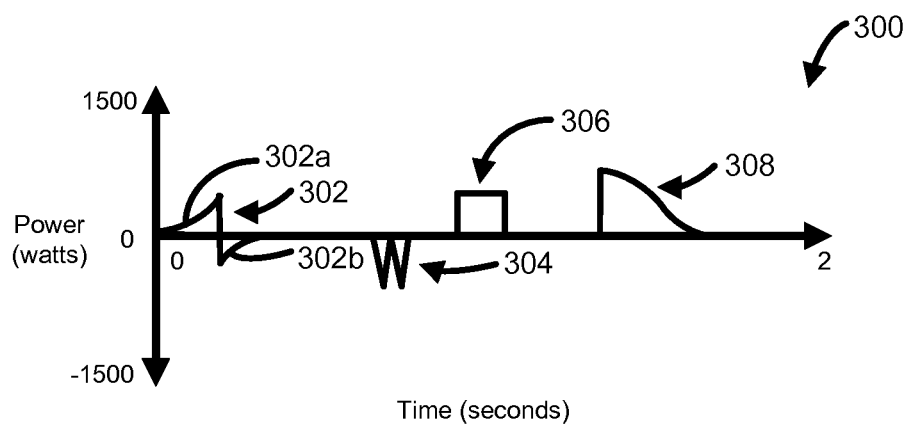
FIG. 6 is a chart illustrating a power compensation profile according to some examples.
Figure 7:
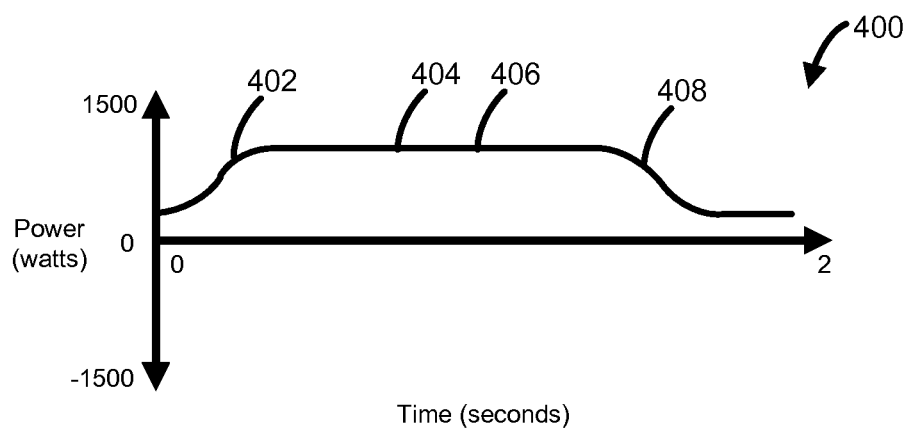
FIG. 7 is a chart illustrating a supply power profile according to some examples.

FIGS. 5-7 are charts illustrating a power consumption profile 200, a power compensation profile 300, and a supply power profile 400 according to some examples. The specific shapes of the power profiles 200, 300 and 400 are provided for illustrative purposes only. Thus, different power profiles 200, 300, and 400 may result from different print jobs, different print engines 102, and/or different electrical devices.

The power consumption profile 200 may represent the power expected to be consumed by the print engine 102 as a function of time during the print job.

The power compensation profile 300 may represent the power to be provided (1) by the power supply 104 to the power management apparatus 132 as a function of time during the print job, as shown in the positive power regions, and (2) by the power management apparatus 132 to the print engine 102 as a function of time during the print job, as shown in the negative power regions.

The supply power profile 400 may represent the power to be provided by the power supply 104 as a function of time during the print job to the print engine 102 and the power management apparatus 132. In the absence of the power management apparatus 132, the supply power profile 400 would be the same as the power consumption profile 200, however because the power management apparatus 132 is present, the supply power profile 400 (1) is higher than the power consumption profile 200 in regions where the power management apparatus 132 consumes power from the power supply (2) is lower than the power consumption profile 200 in regions where the modified such that the power profile Thus, the power provided by the power management apparatus 132 according to the power compensation profile 300 may allow the supply power profile 400 of power to be provided by the power supply 104 to be smoothed out with reduced incidences of rapid power changes such as flicker, as will be described in more detail.

Figure 8:
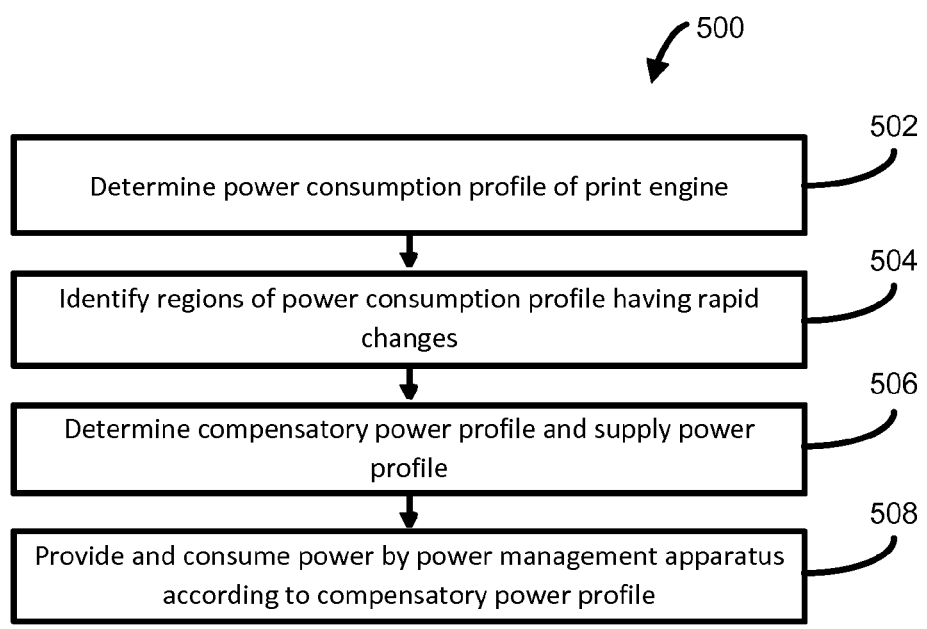
FIG. 8 is a flow diagram illustrating a power management method according to some examples.

FIG. 8 is a flow diagram illustrating a power management method 500 according to some examples. The method may be computer implemented. In some examples, the orderings shown may be varied, such that some steps may occur simultaneously, some steps may be added, and some steps may be omitted. In describing FIG. 8, reference will made to FIGS. 4-7.

At 502, the controller 130 may determine the power consumption profile 200 by the print engine 102, as described earlier. Then, the controller 112 may access the determined power consumption profile 200 from the controller 130 via the connection 122. In other examples, the controller 112 may access image data or printing agent delivery control data from the controller 130 via the connection 122. Then, the controller 112 may determine the power consumption profile 200 based on the image data or the printing agent delivery control data, as described earlier.

At 504, the controller 112 may identify regions, such as regions 202, 204, 206, and 208, in the power consumption profile 200 having rapid changes in power consumption as a function of time. For example, region 202 may be an example of a rapid power step, region 204 may be an example of flicker, region 206 may be an example of a stepped power trough, and region 208 may be an example of a rapid power step and a prolonged low power period. Power consumption profiles may also contain various other types of rapid changes as well. In some examples, these rapid changes may arise due to non-uniformities in the image to be printed on the substrate. For example, when printing a dense area of an image, a motor in the print engine 102 may accelerate. By contrast, the motor may slow down when approaching a blank area of the image after printing the dense area. However, in other examples, other aspects of the operation of the system 100 may cause the rapid changes.

Thus, at 506, the controller 112 may determine a power compensation profile 300 and a supply power profile 400. Since the overall power supplied to the print engine 102 may come from both the power supply 104 and the power management apparatus 132, the power compensation profile 300 may be defined so as to compensate for the rapid power changes, such as flicker, that would otherwise be present in the supply power profile 400. Thus, the supply power profile 400 may be smoothed out with reduced incidences of rapid power changes such as flicker that are present in the power consumption profile 200.

For example, the controller 122 may determine that the charger 108 is to charge the energy storage 106 from the power supply 104 (1) during a power minimum, e.g. a low consumption period, and/or (2) when a future power maximum, e.g. a high peak consumption region, in the power profile 200 is approaching. This may save energy in the energy storage 106 for use during the power maximum, e.g. high peak consumption, and may smooth out the transition from the low to high consumption period. The charging may, for example, be a smooth ramp, so as not to produce flicker in the supply power profile 400 of the power supply 102.

Additionally, the controller 122 may determine that the discharger 110 is to discharge the energy storage 106 for use by the print engine 104 (1) during a power maximum, e.g. a high consumption region, and/or (2) when a power minimum, e.g. future lack of consumption, in the power consumption profile 200 is approaching. This may smooth out the power maximum, e.g. the high peak, and may leave the energy storage 106 empty for future charging events such as those described above.

The charging and discharging may be performed according to the power compensation profile 300. The charging and discharging regions of the power compensation profile 300 may, in some examples, be determined by applying an infinite impulse response (IIR) filter to suitable regions in the power consumption profile 200.

In the examples illustrated in FIGS. 5-7, the power compensation profile 300 which may include compensation regions 302, 304, 306, and 308 corresponding to the regions 202, 204, 206, and 208 in the power consumption profile 200. Each of the compensation regions 302, 304, 306, and 308 are shown to accomplish different types of compensation, as follows.

The compensation region 302 may include a positive power region 302*a* and a negative power region 302*b* so as to smooth out the region 202, which is in between a power minimum and a power maximum separated by a step in the power consumption profile 200, into the smoothed region 402 in supply power profile 400. In the positive power region 302*a*, the charger 108 may be to charge the energy storage 106 such that power is consumed from the power supply 104, and in the negative power region 302*b*, the discharger 110 may be to discharge the energy storage 106 such that power is provided to the print engine 102.

The compensation region 304 may include two negative power peaks so as to smooth out the two positive power maximum 204, e.g. peaks, in the power consumption profile 200 into the smoothed region 404 in supply power profile 400. In the compensation region 304, the discharger 110 may be to discharge the energy storage 106 such that power is provided to the print engine 102.

The compensation region 306 may include a positive power peak so as to smooth out the power minimum 206, e.g. stepped trough region, in the power consumption profile 200 into the smoothed region 406 in supply power profile 400, and to charge the energy storage 308. In the compensation region 306, the charger 108 may be to charge the energy storage 106 such that power is consumed from the power supply 104.

The compensation region 308 may include a smooth positive power region so as to smooth out the region 208, which is in between a power maximum and a power minimum separated by a step in the power consumption profile 200, into the smoothed region 408 in supply power profile 400, and to use the prolonged low power region in the region 208 to charge the energy storage 106 using the charger 108 with power consumed from the power supply 104.

At 508, the power management apparatus 132 may provide and consume power according to the power compensation profile 300, and the power supply 104 may provide power according to the supply power profile 400, such that the print engine 102 consumes power according the power consumption profile 200.

For example, during printing, the controller 112 may control the energy or charge stored in the energy storage 106 by charging and discharging the energy storage 112 at suitable predetermined times according to the power compensation profile 300, as described above relative to step 306.

Although step 508 is described above as performed according to predetermined power profiles 300 and 400, in other examples the power profiles 300 and 400 may be determined dynamically by the controller 112 during the print job.

Figure 9:
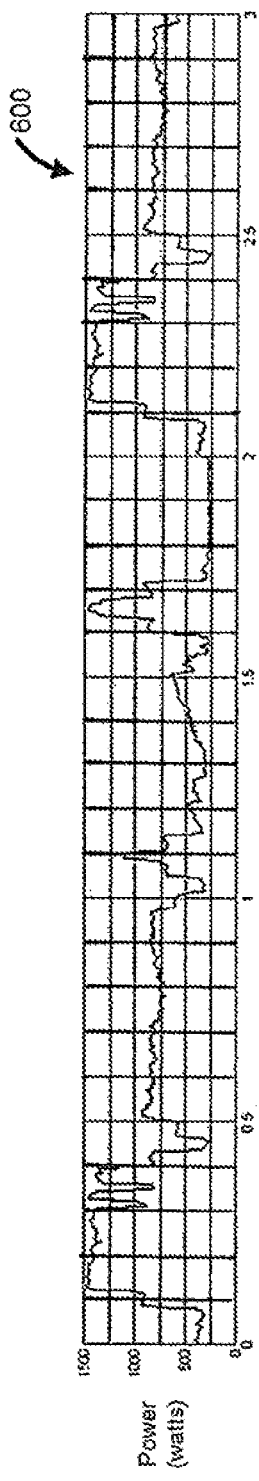
FIG. 9 is a chart illustrating a power consumption profile according to some examples.
Figure 10:
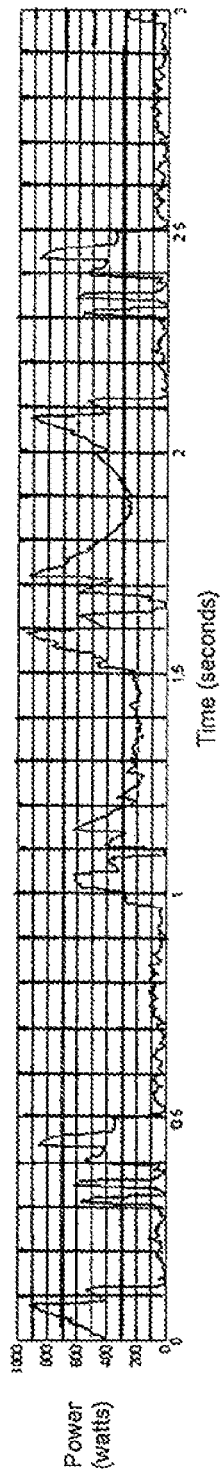
FIG. 10 is a chart illustrating a power compensation profile according to some examples.
Figure 11:
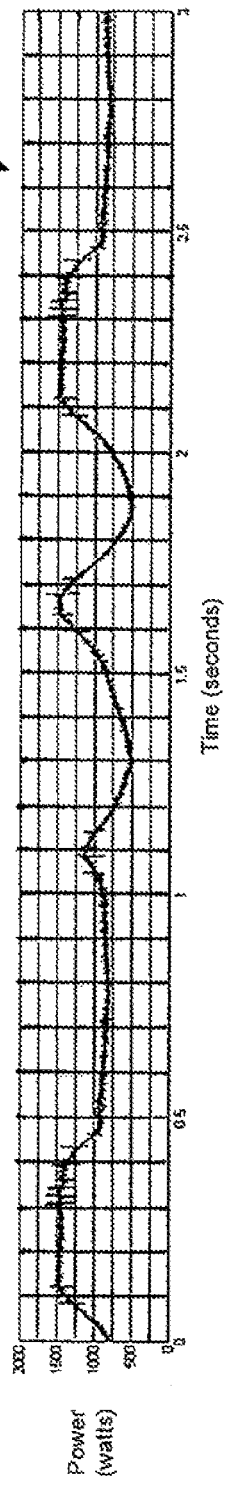
FIG. 11 is a chart illustrating a supply power profile according to some examples.

FIGS. 9-11 are charts illustrating a power consumption profile 600, a power compensation profile 700, and a supply power profile 800 according to some examples. The power consumption profile 600 in the example of various different regions having rapid power changes, such as regions including flicker. The power compensation profile 700 and the supply power profile 800 may generally be determined based on the power consumption profile 600, according to similar methods as those described earlier. However, in this example, after generating the power compensation profile according to the methods described earlier, the power compensation profile 700 is then boosted positively in all regions such that there are no negative power regions. Thus, in all regions, the charger 108 is to provide power from the power supply 104 to the energy storage 106. This may similarly result in a smoothed supply power profile 800 with reduced rapid power changes and reduced flicker, except that the supply power profile 800 may represent greater overall power to be provided by the power supply 104 relative to if the positive boost was not performed.

All of the features disclosed in this specification (including any accompanying claims, abstract and drawings), and/or all of the steps of any method or process so disclosed, may be combined in any combination, except combinations where at least some of such features and/or steps are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

What is claimed is:

1. A power management apparatus to be electrically disposed between an electrical device and a power supply, the power supply to power the electrical device, the power management apparatus comprising:
   an energy storage;
   a discharger to provide power from the energy storage to the electrical device;
   a charger to provide power from the power supply to the energy storage; and
   a controller to:
      control the discharger to provide power from the energy storage to the electrical device during a period when the electrical device is to require a power maximum;
      control the charger to provide power from the power supply to the energy storage during a period when the electrical device is to require a power minimum; and
      control the charger and the discharger based on a power consumption profile that represents power expected to be consumed by the electrical device as a function of time.

2. The power management apparatus of claim 1 wherein the controller is to determine, based on a power consumption profile representing power expected to be consumed by the electrical device as a function of time, a power compensation profile representing power to be provided to and from the energy storage as a function of time, wherein the controller is to control the charger and discharger based on the power compensation profile.

3. The power management apparatus of claim 1 wherein the power supply is to experience less flicker in power relative to if the power management apparatus did not charge or discharge the energy storage.

4. The power management apparatus of claim 1 wherein the controller is to:
   control the discharger to provide the power from the energy storage to the electrical device during the period (1) when the electrical device is to require the power maximum, and (2) when a future power minimum to be required by the electrical device is approaching; and
   control the charger to provide the power from the power supply to the energy storage during the period (1) when the electrical device is to require the power minimum, and (2) when a future power maximum to be required by the electrical device is approaching.

5. A printing system comprising:
   the power supply;
   the electrical device, the electrical device comprising a printing engine; and
   the power management apparatus of claim 1.

6. The power management apparatus of claim 1 wherein the energy storage system comprises a capacitor.

7. The power management apparatus of claim 1 wherein the charger comprises a boost converter and the discharger comprises a buck converter.

8. A non-transitory computer readable storage medium including executable instructions that, when executed by a processor, cause the processor to:
   control a discharger to:
      provide power from an energy storage to a print engine when the print engine is to require a power maximum, the print engine being powered by a power supply;
      provide power from the energy storage to an electrical device:
         when the print engine is to require the power maximum; and
         when a future power minimum to be required by the electrical device is approaching; and
   control a charger to:
      provide power from the power supply to the energy storage when the print engine is to require a power minimum; and
      provide power from the power supply to the energy storage:
         when the electrical device is to require the power minimum; and
         when a future power maximum to be required by the electrical device is approaching.

9. The non-transitory computer readable storage medium of claim 8 further comprising executable instructions that, when executed by the processor, cause the processor to control the charger and discharger based on a power consumption profile that represents power expected to be consumed by the print engine as a function of time.

10. The non-transitory computer readable storage medium of claim 9 further comprising executable instructions that, when executed by the processor, cause the processor to determine, based on a power consumption profile, a power compensation profile representing power to be provided to and from the energy storage as a function of time, wherein the controller is to control the charger and discharger based on the power compensation profile.

11. A power management method comprising:
using a discharger, discharging an energy storage to provide power to a print engine during a period when a future power minimum to be required by the print engine is approaching; and
using a charger, charging an energy storage using power from a power supply during a period when a future power maximum to be required by the print engine is approaching, the print engine being powered by a power supply.

12. The power management method of claim 11 wherein the power supply is to experience less flicker in power relative to if the energy storage was not charged or discharged.

13. The power management method of claim 11 wherein:
discharging the energy storage comprises discharging the energy storage to provide the power to the print engine during the period (1) when the future power minimum to be required by the print engine is approaching, and (2) when the print engine is to require a power maximum; and
charging the energy storage comprises charging the energy storage using the power from the power supply during the period (1) when the future power maximum to be required by the print engine is approaching, and (2) when the print engine is to require a power minimum.

* * * * *